United States Patent [19]
Frankfurter et al.

[11] Patent Number: 5,077,105
[45] Date of Patent: Dec. 31, 1991

[54] ALUMINUM OXIDE TUBES

[75] Inventors: Günter Frankfurter, Marktredwitz; Reinhard Manner, Maintal, both of Fed. Rep. of Germany

[73] Assignee: Hoechst Aktiengesellschaft, Frankfurt am Main, Fed. Rep. of Germany

[21] Appl. No.: 440,107

[22] Filed: Nov. 22, 1989

Related U.S. Application Data

[63] Continuation-in-part of Ser. No. 257,019, Oct. 13, 1988, abandoned.

[30] Foreign Application Priority Data

Oct. 15, 1987 [DE] Fed. Rep. of Germany ....... 3734914

[51] Int. Cl.⁵ .............................................. F16L 9/10
[52] U.S. Cl. .................................. 428/34.6; 138/145; 428/212; 428/215; 428/307.3
[58] Field of Search .............. 138/145; 428/34.4, 34.6, 428/212, 215, 307.3

[56] References Cited
U.S. PATENT DOCUMENTS 4,222,978  9/1980  Oda et al. ............................ 501/153
4,396,595  8/1983  Heytmeijer et al. .................. 264/65
4,749,601  1/1984  Shimai et al. ........................ 501/153

Primary Examiner—James J. Seidleck
Attorney, Agent, or Firm—Foley & Lardner

[57] ABSTRACT

A gas-tight aluminum oxide tube having an $Al_2O_3$ content of 98.0 to 99.8 wt-%, wherein the interior of the tube has a coating of $Al_2O_3$ with a thickness of from 0.03 to 0.30 mm and a mean roughness $R_a$ of 2 to 10 μm, is provided. Preferably, the outer surface of the tube can have a mean roughness of 1.0 to 1.5 μm. Also, the coating material can contain from 15 to 30 vol-% pores and the tube material can contain from 5 to 10 vol-% pores.

6 Claims, 2 Drawing Sheets

ALUMINUM OXIDE TUBES

This application is a continuation-in-part of application Ser. No. 07/257,019. filed Oct. 13, 1988, now abandoned.

BACKGROUND OF THE INVENTION

The present invention relates to gas-tight tubes made from aluminum oxide ceramic material with an interior coating. Gas-tight ceramic tubes are used in the BMA process at high temperatures to convert a mixture of methane and ammonia catalytically to hydrogen cyanide and hydrogen (compare Chemie-Technik 1978, p. 231). The conversion is carried out on a platinum catalyst which has been applied to the interior of an aluminum oxide tube. The tubes are suspended inside a combustion chamber and are maintained at about 1250° C.

The tubes employed must be gas-tight and resistant to high temperatures. Furthermore, their interior must be capable of taking up the required amount of platinum per unit area. The coating of an $Al_2O_3$ catalyst tube with a platinum solution is described in Example 1 of DBP 3,034,957. The process has the shortcoming that in each case only a part of the required platinum may be applied in one drying operation. For this reason the application of the catalytic metal to the interior of the tube requires several drying operations. The manufacture of aluminum oxide tubes which are suitable for the BMA process and which are assigned to the material classes KER 708 and KER 710 according to DIN 40685, has been known for a long time as the state of the art. The object has been to form these tubes in such a manner that the coating process can be carried out in fewer operations.

SUMMARY OF THE INVENTION

The invention is based on the knowledge that the problem may be overcome by increasing the surface roughness on the interior of the tube. Aluminum oxide tubes having a minimum $Al_2O_3$ content of 80% which have been produced by vacuum extrusion and subsequent sintering usually have a surface roughness $R_a$ of 1.0 to 1.5 $\mu$m.

A process has now been found for the manufacture of a gas-tight aluminum oxide tube which is suitable for performing catalytic high-temperature reactions, in which process water and a binder and plasticizer are added to the aluminum oxide powder, the mixture is extruded to give a tubular green body, the tube is dense-sintered at about 1740° C. and the sintered tube is optionally impregnated with a solution containing catalytically active metal ions, wherein a) an aqueous suspension of aluminum oxide powder is obtained by grinding the aluminum oxide, a spray powder of a maximum particle size of 200 $\mu$m is produced therefrom by spraying, the spray powder is presintered at a temperature T between 1300° and 1400° C., the pre-sintered spray powder is ground with water and a water-soluble stabilizing agent until the grinding residue left behind on a sieve of 63 $\mu$m inside mesh size is 0.2 to 0.4% by weight, b) the aqueous suspension from stage a) is spray-dried, and water and a plasticizer are added to the resultant spray powder, the mixture is kneaded to give a plastic mass and this mass is extruded to give a tubular green body and the extruded tubular green body is also pre-sintered at temperature T, c) the presintered tube is immersed in water in order to fill the pores with water, the tube is briefly dried in order to expel a small part of the water from the pores, the ground mixture consisting of water/-stabilizing agent/spray powder is applied to the interior of the tube and the non-adhering residue is poured off and d) the tube with its coated interior is dried and finally dense-sintered at about 1740° C.

There is also provided a gas-tight aluminum oxide tube having an $Al_2O_3$ content of 98.0 to 99.8 wt-%, wherein the interior of the tube has a coating of $Al_2O_3$ with a thickness of from 0.03 to 0.30 mm and a mean roughness $R_a$ of 2 to 10 $\mu$m, and wherein the outer surface of the tube has a mean roughness of 1.0 to 1.5 $\mu$m.

Also, there is provided a gas-tight aluminum oxide tube having an $Al_2O_3$ content of 98.0 to 99.8wt-%, wherein the interior of the tube has a coating of $Al_2O_3$ with a thickness of from 0.03 to 0.30 mm and a mean roughness $R_a$ of 2 to 10 $\mu$m, the coating material contains from 15 to 30 vol-% pores and the tube material contains from 5 to 10 vol-% pores.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawing by which

DETAILED DESCRIPTION OF PREFERRED EMBODIMENTS

Figure 1:
FIG. 1 is a scanning microscopy photograph of the uncoated (outer) surface of a tube.

The manufacture of aluminum oxide tubes has been known for many years. Examples of the manufacture of transparent aluminum oxide tubes may be found, for example, in DE-OS 3,201,750, DE-OS 2,810,128, U.S. Pat. No. 4,396,595 and in European Application 134,277. Since in the present case the tubes are not translucent (total transmittance below 90%) inorganic dopants, such as $La_2O_3$, $Y_2O_3$ or zirconium, may be dispensed with.

The purity of the aluminum oxide used should be at least 98%. The tube material obtained has an $Al_2O_3$ content of 98.0 to 99.8%.

The first grinding of aluminum oxide in stage a) is best carried out until gas-tightness can be achieved in the later firing at 1700°. This is the case at a mean particle diameter below 15 $\mu$m, particularly from 2 to 5 $\mu$m. The spraying procedure in stage a) is preferably carried out after the addition of a binder, since then a uniform powder results with only a small proportion of very fine material. The water-soluble stabilizing agent is usually an organic compound which decomposes during the sintering process without leaving a residue.

Compounds which may be used for this purpose, are, for example, polyvinyl alcohol, polyvinyl acetate dispersion or polyethylene glycol. All these compounds increase the viscosity of the solution and thus prevent the high-density aluminium oxide settling out.

The spraying in stage b) is preferably carried out without the addition of a binder. Plasticizers usually employed in stage b) are high-molecular organic compounds such as polyvinyl alcohol and/or methylcellulose or water-soluble starches (dextrin). The tubes are usually produced by extrusion; however, the tube may be also produced by isostatic pressing, but this is not customary for reasons of cost. It is essential that the temperature during presintering of the tubular green body coincides with the temperature T at which the sprayed powder from stage a) has been presintered. Furthermore, the composition of the presintered spray powder and the pre-sintered tubular green body should be the same.

The water content of the moist tube is obtainable from the weights of the presintered tube and that of the tube after immersion in water. "A small part" of the water which is to be removed by drying, is understood to mean 2 to 10, preferably 3 to 8, % of the water. Even if still greater proportions of the water are removed from the pores by drying, the interior remains coated. However, with increasing absorptive power of the tube it becomes increasingly difficult to reproduce a constant coating thickness. The thickness to aim for is a thickness of the (sintered) interior coating from 0.03 to 0.30 mm, in particular from 0.05 to 0.25 mm. Greater thicknesses are possible, but they represent no advantages for the catalytic reactions. Furthermore, an increasing coating thickness constitutes the danger that stresses may form between the coating and the body of the tube during drying and sintering which may lead to the coating becoming detached. The solids content of the aqueous coating mass is about 30 to 50% by weight. Thinner masses may be also used, provided that a sufficiently effective organic stabilizing agent has been used. With a decreasing proportion of aluminum oxide the proportion of stabilizing agent must be increased in order to prevent settling out. The tube with coating has a thickness of at least 1 mm, preferably from 1 to 10 mm, especially 1.5 to 6 mm, more especially 2 to 4 mm.

The tubes which have been coated by the process according to the invention have on the interior surface a mean roughness $R_a$ of 2 to 10 $\mu$m, preferably 3 to 6 $\mu$m. The roughness may be varied by varying the grinding time of the pre-sintered spray powder in water with a water-soluble stabilizing agent. Reducing the grinding time increases the mean roughness, extending the grinding time reduces it.

The mean roughness $R_a$ of the uncoated sintered tube is about 1 to 1.5 $\mu$m. The roughness on the outside of the tube is not influenced by coating the inside of the tube.

The tube obtained has high mechanical strength (about 350 to 450 N/mm$^2$ according to 3-point-tests). The gross density of the tube material (without inner coating) is in the range of about 3.8 to 3.9 g/cm$^3$. Both tube and inner coating are gas-tight and contain closed pores. The tube material (without coating) contains about 5 to 10 vol-% pores, the coating about 15 to 30 vol-%.

Due to the process used, sintered coating and tube material have different size distribution of aluminum oxide crystals.

The higher density of the green tube as compared to the green coating favors formation of large $Al_2O_3$ crystals in the range of about 5 to 50 $\mu$m (average: 8 to 30 $\mu$m, preferably 10 to 25 $\mu$m, especially 15 to 20 $\mu$m). The crystal size of the sintered coating is in the range of 2 to 5 $\mu$m (average: 3 to 4 $\mu$m).

The coating on the interior surface provides a large surface which is helpful to soak up the catalyst solution and provides high roughness which increases the yield in the BMA process. A tube having the same composition and a crystal structure as the inner coating would have a lower strength of about 100 to 200 N/mm$_2$.

The operation of coating the catalyst may be distinctly shortened by the process according to the invention. One operation is usually sufficient. Furthermore, a measurable increase of the specific yield of the BMA process takes place.

The invention is elucidated in greater detail by the Example.

EXAMPLE

Aluminum oxide powder of 99% purity is comminuted by wet grinding in an Alsing cylinder. The mean particle diameter resulting from this wet grinding ($d_{50}$ value) is about 3 $\mu$m. To convert it into tubes, the $Al_2O_3$ powder suspension is spray-dried, formed into a paste with water and a plasticizer and vacuum extruded to form tubes. The tubes have an exterior diameter of 22 mm, an interior diameter of 17 mm and a length of 2.1 m. The tubes are dried and presintered at 1350° C. They then possess a water absorbing capacity of 10 to 15% by weight. Their strength (bending strength) is from about 110 to 170 N/mm$^2$.

For further processing to produce the interior coating, the initial suspension of the wet-ground $Al_2O_3$ powder is spray dried after the addition of 10% of polyglycol. A granular mass with a particle size distribution of up to 200 $\mu$m results.

Presintering also takes place at 1350° C. In order to obtain the desired surface roughness, a defined wet grinding is carried out. For this purpose 8 kg of the grinding body ($Al_2O_3$) of up to 22 mm in diameter, 4 kg of presintered spray granules, 4 liters of water and 0.8 kg of polyethylene glycol 20,000 were introduced in a porcelain Alsing cylinder and then ground. A sieve residue of 0.3% was left behind on a sieve of 63 $\mu$m inside mesh size after 10 hours.

The presintered tubes were placed in water for 10 minutes in order to saturate the open pores. The tubes were then allowed to dry for 20 minutes at room temperature. The coating suspension obtained by grinding was applied to the interior of the tubes and immediately poured out again. A thin uniform coating on the interior surface of the tube results.

The tubes are then dried at 50° C. and fired at 1740° C. The tube and the applied coating are sintered thereby.

The tube has the following composition: 99.4 wt-% $Al_2O_3$; 0.4 wt-% $SiO_2$; 0.2 wt-% MgO.

Figure 2:
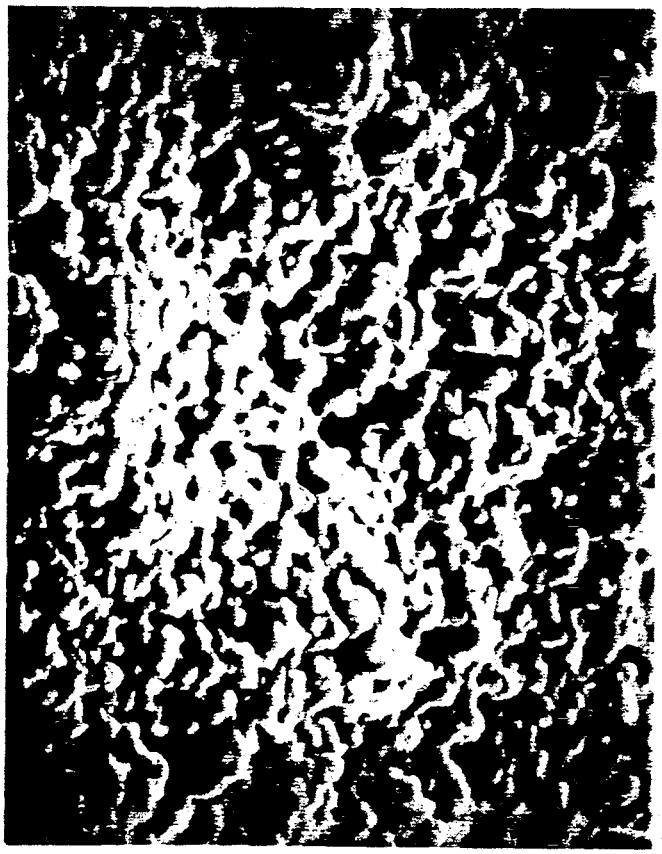
FIG. 2 is a scanning microscopy photograph of the tube's coated surface.
Figure 3:
FIG. 3 is a sectional view of the tube through the coated surface. In all cases the magnification is 640-fold.

FIG. 1 is a scanning microscopy photography of the uncoated (outer) surface of a tube. FIG. 2 is a scanning microscopy photography of the tube's coated surface. FIG. 3 shows a sectional view of the tube through the coated surface. In all cases the amplification is 640-fold.

What is claimed is:

1. A gas-tight aluminum oxide tube with an $Al_2O_3$-content of 98.0 to 99.8 wt-%, wherein the interior of the tube has a coating of $Al_2O_3$ with a thickness of from 0.03 to 0.30 mm and a mean roughness $R_a$ of 2 to 10 μm and wherein the outer surface of the tube has a mean roughness of 1.0 to 1.5 μm.

2. A tube as claimed in claim 1, wherein the interior of the tube has a coating of aluminum oxide with a mean roughness of 3 to 6 μm.

3. A tube as claimed in claim 1, wherein the average size of the particles forming the tube without the coating is in the range of 8 to 30 μm and the average size of the particles of the coating of the tube is in the range of 3 to 4 μm.

4. A tube as claimed in claim 1, wherein the tube and coating have a combined thickness of 1 to 10 μmm.

5. A tube as claimed in claim 1, wherein the coating contains from 15 to 30 vol-% pores and the tube material contains from 5 to 10 vol-% pores.

6. A gas-tight aluminum oxide tube with an $Al_2O_3$-content of 98.0 to 99.8 wt-%, wherein the interior of the tube has a coating of $Al_2O_3$ with a thickness of from 0.03 to 0.30 mm and a mean roughness $R_a$ of 2 to 10 μm, the coating material containing from 15 to 30 vol-% pores and the tube material containing from 5 to 10 vol-% pores.

* * * * *